United States Patent
Lee et al.

(10) Patent No.: US 9,563,747 B2
(45) Date of Patent: Feb. 7, 2017

(54) METHOD FOR PROVIDING DRM SERVICE AND ELECTRONIC DEVICE THEREOF

(71) Applicant: Samsung Electronics Co., Ltd., Gyeonggi-do (KR)

(72) Inventors: One-Gun Lee, Seoul (KR); Hong-Seok Jeong, Gyeonggi-do (KR); Hyun-Ho Park, Seoul (KR); Ju-Pyo Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 14/274,649

(22) Filed: May 9, 2014

(65) Prior Publication Data

US 2014/0337929 A1 Nov. 13, 2014

(30) Foreign Application Priority Data

May 9, 2013 (KR) ........................ 10-2013-0052573

(51) Int. Cl.

| | |
|---|---|
| *G06F 21/10* | (2013.01) |
| *H04N 21/41* | (2011.01) |
| *H04N 21/4363* | (2011.01) |
| *H04N 21/4367* | (2011.01) |
| *H04N 21/4627* | (2011.01) |

(52) U.S. Cl.
CPC .......... *G06F 21/10* (2013.01); *H04N 21/4126* (2013.01); *H04N 21/4367* (2013.01); *H04N 21/43635* (2013.01); *H04N 21/4627* (2013.01)

(58) Field of Classification Search
CPC .... G06F 21/126; G06F 21/10; H04N 21/4126; H04N 21/43635; H04N 21/4367; H04N 21/4627

See application file for complete search history.

(56) References Cited

U.S. PATENT DOCUMENTS

| | | | | |
|---|---|---|---|---|
| 7,152,243 B2* | 12/2006 | Bourne | ................... | G06F 21/10 713/176 |
| 7,950,020 B2* | 5/2011 | Sun | ..................... | G06F 12/1441 713/100 |
| 8,291,238 B2* | 10/2012 | Ginter | .................... | G06F 21/10 713/189 |
| 8,625,788 B2 | 1/2014 | Pendakur et al. | | |
| 9,092,627 B2* | 7/2015 | Lee | ........................ | G06F 21/57 |

(Continued)

FOREIGN PATENT DOCUMENTS

KR    10-2010-0106567    10/2010

OTHER PUBLICATIONS

Extended European Search Report dated Oct. 21, 2014 in connection with European Patent Application No. 14167153.7; 6 pages.

(Continued)

*Primary Examiner* — Jung Kim
*Assistant Examiner* — James J Wilcox

(57) ABSTRACT

Provided is an electronic device. The electronic device includes at least one processor for executing a plurality of operating systems; and a mobile high-definition link (MHL) module. The operating systems include a normal operating system for controlling a content service and a secure operating system for receiving information for controlling digital rights management (DRM) content from the MHL module and controlling a DRM service.

15 Claims, 7 Drawing Sheets

(56) References Cited

U.S. PATENT DOCUMENTS

| | | | | |
|---|---|---|---|---|
| 9,106,425 B2* | 8/2015 | Murphey | ............... | G06F 21/10 |
| 9,152,798 B1* | 10/2015 | Drewry | .................. | G06F 21/60 |
| 9,223,988 B1* | 12/2015 | Dorwin | .............. | G06F 21/6209 |
| 2005/0268339 A1* | 12/2005 | Bobrow | ................. | G06F 21/10 |
| | | | | 726/26 |
| 2008/0320543 A1* | 12/2008 | Wang | .................... | H04N 7/162 |
| | | | | 725/131 |
| 2008/0320596 A1* | 12/2008 | Wang | .................... | G06F 21/10 |
| | | | | 726/26 |
| 2009/0156051 A1 | 6/2009 | Doyle et al. | | |
| 2010/0132015 A1* | 5/2010 | Lee | ........................ | G06F 21/57 |
| | | | | 726/3 |
| 2012/0020475 A1 | 1/2012 | Altmann | | |
| 2012/0173877 A1 | 7/2012 | Pendakur et al. | | |
| 2013/0145424 A1* | 6/2013 | Wang | .................... | G06F 21/10 |
| | | | | 726/2 |
| 2013/0152149 A1* | 6/2013 | Park | ................. | H04N 21/4126 |
| | | | | 725/114 |
| 2013/0279693 A1* | 10/2013 | Rothschild | ....... | H04N 21/43637 |
| | | | | 380/200 |
| 2014/0115623 A1* | 4/2014 | Rajgopal | ............. | H04N 21/835 |
| | | | | 725/25 |
| 2014/0115646 A1* | 4/2014 | Rajgopal | ........... | H04N 21/4622 |
| | | | | 725/110 |
| 2016/0127770 A1* | 5/2016 | Je | ...................... | H04N 21/4122 |
| | | | | 386/231 |

OTHER PUBLICATIONS

European Examination Report dated Feb. 23, 2016 in connection with European Patent Application No. 14167153.7; 5 pages.

\* cited by examiner

METHOD FOR PROVIDING DRM SERVICE AND ELECTRONIC DEVICE THEREOF

PRIORITY

The present application is related to and claims priority under 35 U.S.C. §119 to an application filed in the Korean Intellectual Property Office on May 9, 2013 and assigned Ser. No. 10-2013-0052573, the contents of which are incorporated herein by reference.

TECHNICAL FIELD

The present disclosure relates to the method for providing a digital rights management (DRM) service and an electronic device thereof.

BACKGROUND

A high-definition multimedia interface (HDMI) refers to a multimedia interface for transferring uncompressed digital video and audio signals to one cable simultaneously.

An electronic device may continuously check several variables, such as high-bandwidth digital content protection (HDCP) state information in order to increase security for DRM content when playing back DRM content using the HDMI. For example, when a HDCP fail is detected based on the HDCP state information, the electronic device suspends decoding or decryption of the DRM content and cuts off output of digital video and audio signals for the DRM content.

Therefore, the electronic device needs a method for protecting variables from security attack in order to increase security for DRM content. Furthermore, when a HDCP module for generating HDCP is separate from a DRM module for controlling DRM services, the HDCP state information is exposed to the outside when being transmitted from the HDCP module to the DRM module, causing vulnerability to a security attack. Therefore, there is a need for a method for protecting HDCP state information, transmitted from the HDCP module to the DRM module, from a security attack in electronic devices.

SUMMARY

To address the above-discussed deficiencies, it is a primary object to provide an apparatus and method for enhancing security for DRM content in an electronic device.

Another aspect of the present disclosure is to provide an apparatus and method for enhancing security for HDCP state information in an electronic device.

Another aspect of the present disclosure is to provide an apparatus and method for enhancing security for HDCP state information in an electronic device employing a secure operating system (secure world).

Another aspect of the present disclosure is to provide an apparatus and method for acquiring HDCP state information from a mobile high-definition link (MHL) module in a secure operating system for an electronic device.

Another aspect of the present disclosure is to provide an apparatus and method for connecting to a mobile high-definition link (MHL) module through a control interface, to which access by a normal operating system (normal world) is not allowed, in a secure operating system for an electronic device.

Another aspect of the present disclosure is to provide an apparatus and method for providing updated HDCP state information to a secure operating system through a control interface, to which access by a normal operating system (normal world) is not allowed, when the HDCP state information is updated in a MHL module for an electronic device.

Another aspect of the present disclosure is to provide an apparatus and method for connecting a secure operating system and a MHL module through a control interface configured by hardware in an electronic device.

According to an aspect of the present disclosure, an electronic device includes: at least one processor for executing a plurality of operating systems; and a mobile high-definition link (MHL) module, wherein the processor includes a normal operating system for controlling a content service, and a secure operating system for receiving information for controlling digital rights management (DRM) content from the MHL module and controlling a DRM service.

According to another aspect of the present disclosure, a method for providing a digital rights management (DRM) service in an electronic device includes: checking a high-bandwidth digital content protocol (HDCP) state information from a mobile high-definition link (MHL) module separate from a processor by using a secure operating system; and controlling the DRM service based on the checked HDCP state information.

According to another aspect of the present disclosure, a computer-readable storage medium storing one or more programs for: checking a high-bandwidth digital content protocol (HDCP) state information from a mobile high-definition link (MHL) module separate from a processor by using a secure operating system; and controlling a DRM service based on the checked HDCP state information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
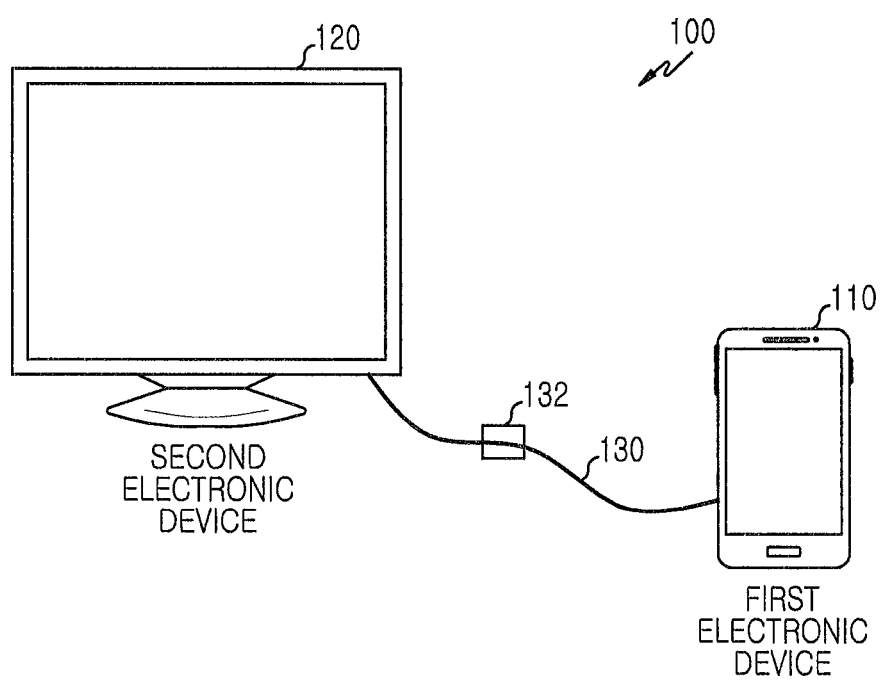
FIG. 1 illustrates a configuration of a HDMI communication network using mobile high-definition link (MHL) according to an embodiment of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein must be understood based on the descriptions made herein.

A touchscreen which has been recently used in various manners is an input or output device for performing the input and display of information on one screen. Therefore, when an electronic device uses the touchscreen, a separate input device, such as a keypad is removed from the electronic device, resulting in increment in the display area thereof. For example, when a full-touch screen in which the entire screen is touchable is used, the electronic device utilizes the entire front surface as a screen, leading to increment of electronic device's screen display region.

The electronic device may playback DRM content using a high-definition multimedia interface (HDMI).

The electronic device continuously checks several variables, such as high-bandwidth digital content protection (HDCP) state information in order to increase security of DRM content upon playback of DRM content. For example, when a HDCP fail is detected according to the HDCP state information, the electronic device may suspend decoding or decryption of the DRM content and cut off the output of digital video and audio signals for the DRM content.

The HDCP state information is provided to the processor which enables a secure operating system separate from a normal operating system to check the HDCP state information, thereby increasing security of the DRM content.

In addition, the HDCP state information may be provided by a MHL module separated from the processor. In this case, a security attach is likely to happen when the secure operating system acquires the HDCP state information.

In order to resolve the problem, the electronic device may further include a control interface having a hardware configuration which increases security between the secure operating system and the MHL module and acquire the HDCP state information through the control interface.

The electronic device may be a portable electronic device, and examples thereof may include a portable terminal, a mobile terminal, a media player, a tablet computer, a handheld computer, or a Personal Digital Assistant (PDA). In addition, the electronic device may be any portable electronic device including a device having two or more functions among the above-described devices. Alternatively, the electronic device may also include any type of electronic device including a display and an input unit. For example, the electronic device includes, a desktop computer, a refrigerator, a multi-function peripheral, a video game console, a digital camera, a Mobile Internet Device (MID), a Ultra Mobile Personal Computer (UMPC), a navigation device, a smart TV, a digital clock, an MP3 player, and the like.

In the present disclosure, an electronic device including a touchscreen is described below. Although a touchscreen is not included, it will be easily understood by those skilled in the art that embodiments of the present disclosure are adaptively applied to an electronic device or computing device which has a display and a different input unit.

FIG. 1 illustrates a configuration of a high-definition multimedia interface (HDMI) communication network using a mobile high-definition link according to various embodiments of the present disclosure.

Referring to FIG. 1, a first electronic device 110 in the HDMI communication network 100 may convert DRM content for a HDMI service into MHL signals and transmit the MHL signals to a second electronic device 120 through a MHL cable 130.

The MHL cable 130 may convert the MHL signals provided from the first electronic device 110 into HDMI signals through a converter 132 and transmit the HDMI signals to the second electronic device 120.

The second electronic device 120 may playback the DRM content according to the HDMI signals provided from the first electronic device 100 through the MHL cable 130 and display the DRM content on a display unit. In this case, the second electronic device 120 may generate a first DRM service check variable according to a hash function include in the DRM content and transmit the first DRM service check variable to the first electronic device 110. The DRM service check variable may represent a variable for setting HDCP state information required to protect the HDMI signal or the MHL signal from an external security attack.

The first electronic device 110 may generate a second DRM service check variable according to a hash function for the DRM content transmitted to the second electronic device 120, compare the second DRM service check variable with the first DRM service check variable from the second electronic device 120, and perform provision of a DRM service for the DRM content. For example, when the first DRM service check variable is identical to the second DRM service check variable, the first electronic device 110 may set a HDCP state for the DRM content as "success". Accordingly, the first electronic device 100 may continuously convert DRM content into MHL signals and transmit the MHL signals to the second electronic device 120. When the first DRM service check variable is not identical to the second DRM service check variable, the first electronic device 110 may set the HDCP state for the DRM content to "fail". Therefore, the first electronic device 110 may suspend decoding or decryption of the DRM content and cut off transmission of the DRM content to the second electronic device 120.

In the above-described embodiment, the second electronic device 120 may play back the HDMI signals provided from the MHL cable 130. The MHL cable 130 may convert the MHL signals provided from the first electronic device 110 into HDMI signals through the converter 132 and transmit the HDMI signals to the second electronic device 120.

In another embodiment, the second electronic device 120 may include a converter for converting MHL signals into HDMI signals, convert the MHL signals provided from the first electronic device 110 into the HDMI signals, and playback the HDMI signals. The MHL cable 130 may transmit the MHL signals provided from the first electronic device 110 to the second electronic device 120.

In the above-described embodiment, the first electronic device 110 is a device for playing back the DRM content according to a HDMI signal provided from the first electronic device, such as, a portable electronic device, a portable terminal, a mobile terminal, a mobile pad, a media player, a personal digital assistant (PDA), a desktop computer, a laptop computer, a smart phone, a netbook, a television, a mobile internet device (MID), an ultra mobile personal computer (UMPC), a tablet PC, a navigation device, a smart television (TV), a wristwatch, a digital camera, and an MP3 player. In addition, the electronic device may be any electronic device in which the functions of two or more devices among the above-described devices are integrated.

In addition, the second electronic device 120 is an device for playing back the DRM content according to a HDMI signal provided from the first electronic device, such as, a portable electronic device, a portable terminal, a mobile terminal, a mobile pad, a media player, a personal digital assistant (PDA), a desktop computer, a laptop computer, a smart phone, a netbook, a television, a mobile internet device (MID), an ultra mobile personal computer (UMPC), a tablet PC, a navigation device, a smart television (TV), a wristwatch, a digital camera, and an MP3 player. In addition, the electronic device may be any electronic device in which the functions of two or more devices among the above-described devices are integrated.

Figure 2:
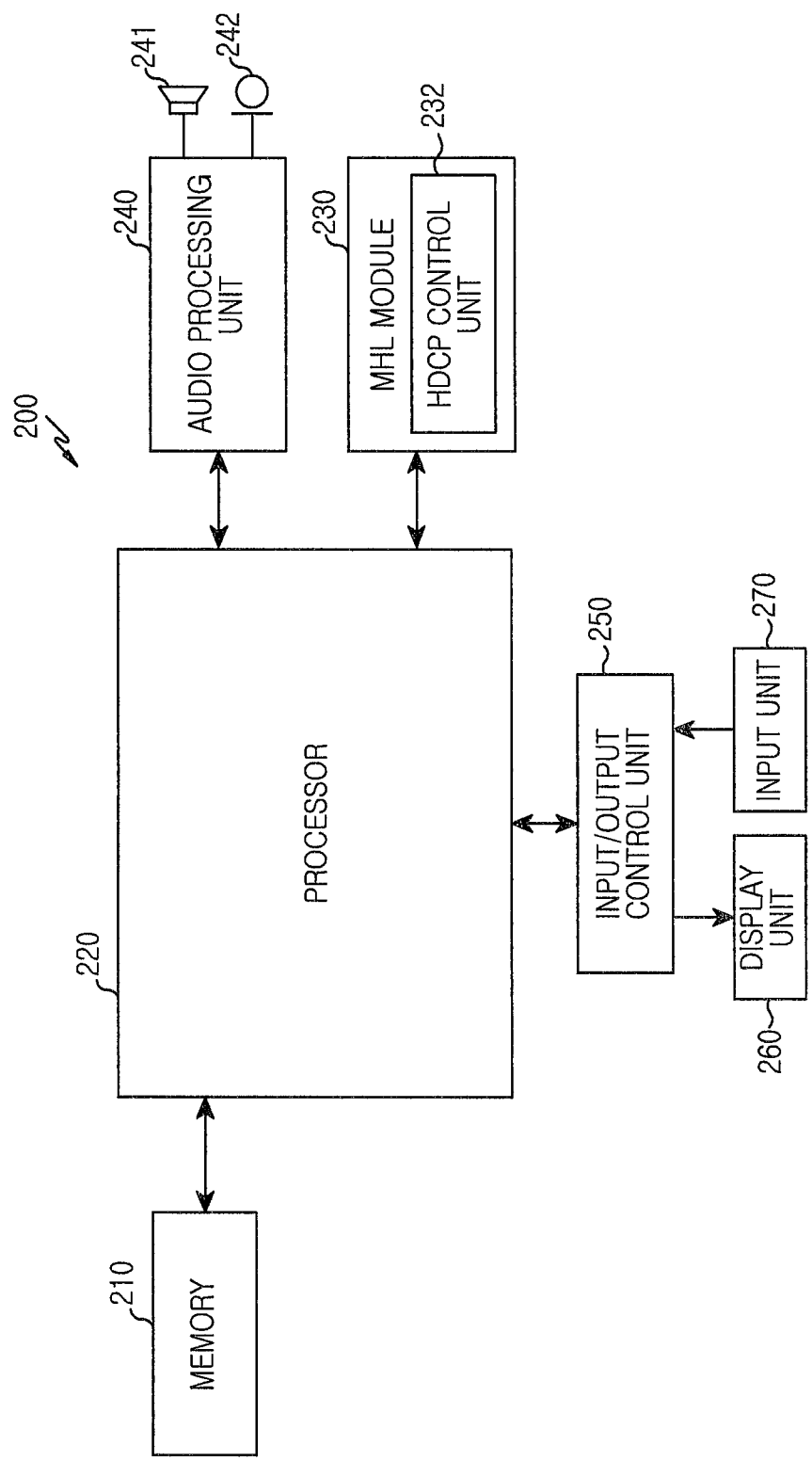
FIG. 2 is a block diagram illustrating an electronic device according to an embodiment of the present disclosure.

FIG. 2 illustrates a block diagram of an electronic device according to various embodiments of the present disclosure. The block configuration of the first electronic device 110 illustrated in FIG. 1 will be described below.

Referring to FIG. 2, an electronic device 200 includes a memory 210, a processor 220, a MHL module 230, an audio processing unit 240, an input/output control unit 250, a display unit 260, and an input unit 270. At least one of the above components may be provided in plural. For example, the electronic device may include a plurality of memories 210, or a plurality of processors 220.

The respective components will be described below.

The memory 210 may include a program storage unit for storing one or more programs for controlling operation of the electronic device 200 and a data storage unit for storing data generated when the electronic device 200 is executed. For example, the program storage unit may include a first operating system, a second operating system, and at least one application program. In this case, the programs stored in the program storage unit may be expressed as an instruction set that is a collection of instructions.

The first operating system may include at least one software component for controlling a user interface service. For example, when content is played back using the second electronic device 120, the first operating system may control a content service. For example, the first operating system converts unencrypted content into HDMI signals and enables the MHL module 230 to convert the HDMI signals into MHL signals and to output the MHL signals. The first operating system may be referred to as a normal operating system (normal world).

The second operating system may include at least one software component for controlling security of the electronic device 200. For example, the second operating system may control a DRM service in consideration of HDCP state information.

In this case, the second operating system may receive the HDCP state information from the MHL module 230 through a control interface. The control interface is an interface connecting the second operating system to the MHL module 230 and is implemented by a hardware configuration to increase security. That is, the control interface may permit only access of the second operating system and limit access to the first operating system, preventing the HDCP state information from being faked.

When the HDCP state information acquired from the MHL module 230 is "success", the second operating system may continuously provide the service using the DRM content. When the HDCP state information acquired from the MHL module 230 is "fail" or when the HDCP for the DRM content is disabled, the second operating system may suspend decoding or decryption of the DRM content.

When it is necessary to check the HDCP state information, the second operating system (for example, DRM content is played back), the second operating system may request HDCP state information from the MHL module 230 through the control interface which is allowed to be accessed only through the second operating system and receive the HDCP state information provided from the MHL module 230 through the control interface in response to the request.

In addition, when the HDCP state information is updated (when an event, for example, HDCP disable, HDCP shutdown, HDCP key mismatching, or HDCP 1st step fail occurs), the second operating system, the second operating system may receive the HDCP state information provided to the control interface by the MHL module. The second operating system may be referred to as a secure operating system (secure world).

The application program may include a software component for at least one application program installed in the electronic device 200.

The processor 220 may perform control such that the electronic device 200 provides various multimedia services using at least one program. In this case, the processor 220 may execute at least one program stored in the memory 210 to provide a service corresponding to the program. For example, the processor 220 executes the first operating system, converts content into HDMI signals, and outputs the HDMI signals to the MHL module 230 to control a content service. In this case, the processor 220 may transmit unencrypted HDMI signals to the MHL module 230. In another example, the processor 220 may execute the second operating system and control a DRM service according to the DRM content. The processor 220 may acquire HDCP state information through an interface that connects the second operating system and the MHL module 230 and control the DRM service according to the DRM content in consideration of the acquired HDCP state information.

The MHL module 230 may convert the HDMI signals provided from the processor 220 into MHL signals and output the MHL signals to an external electronic device. In this case, the MHL module 230 may set and update HDCP state information for the DRM content by using the HDCP control unit 232. For example, when DRM content is transmitted from the first electronic device 110 to the second electronic device 120 as illustrated in FIG. 1, the second electronic device 120 may generate a first DRM service check variable according to a hash function included in the DRM content and transmit the first DRM service check variable to the first electronic device 110. The HDCP control unit 232 may generate a second DRM service check variable according to the hash function of the DRM content transmitted to the second electronic device 120. When the first DRM service check variable is identical to the second DRM service check variable, the HDCP control unit 232 may set a HDCP state for the DRM content to "success". Therefore, the MHL module 230 may continuously provide a service using the DRM content. That is, the MHL module 230 may convert the DRM content into MHL signals and continuously transmit the MHL signals to the second electronic device 120. When the first DRM service check variable is not identical to the second DRM service check variable, the first electronic device 110 may set the HDCP state for the DRM content "fail". Therefore, the MHL module 230 may cut off transmission of the DRM content to the second electronic device 120.

In addition, when a request for HDCP state information generated by the second operating system is detected through the control interface, the MHL module 230 may allow the HDCP state information to be delivered to the second operating system through the control interface.

When the HDCP state information is updated by the HDCP control unit 232, the MHL module 230 may allow the updated HDCP state information to be delivered to the second operating system through the control interface.

The audio processing unit 240 may provide an audio interface between a user and the electronic device 200 through a speaker 241 and a microphone 242.

The input/output control unit 250 may provide an interface between an input/output device, such as the display unit 260 and the input unit 270, and the processor 220.

The display unit 260 may display the state information of the electronic device 200, characters input by the user, moving pictures and/or still pictures. For example, the display unit 260 may display information about application programs executed by the processor 220.

The input unit 270 may provide input data generated by a user's selection to the processor 220 through the input/output control unit 250. In this case, the input device 270 may include a keypad including at least one hardware button, a touch pad for detecting touch information, and the like. For example, the input unit 270 may provide touch information of the touch pad, which is generated by one or more of a touch pen, a finger and a glove on a finger, to the processor 220 through the input/output control unit 250. As an example, the input unit 270 may provide input data requesting a DRM service to the processor 220.

Although not shown in drawings, the electronic device 200 may further include a communication system for executing at least one communication function among voice communication and data communication. In this case, the communication system may be divided into a plurality of communication sub-modules which support different communication networks. For example, the communication networks may include, but not limited to, a GSM (Global System for Mobile Communication) network, an EDGE (Enhanced Data GSM Environment) network, a CDMA (Code Division Multiple Access) network, a W-CDMA (Wideband Code Division Multiple Access) network, an LTE (Long Term Evolution) network, an OFDMA (Orthogonal Frequency Division Multiple Access) network, a wireless LAN, a Bluetooth network, and NFC (Near Field Communication) network.

Figure 3:
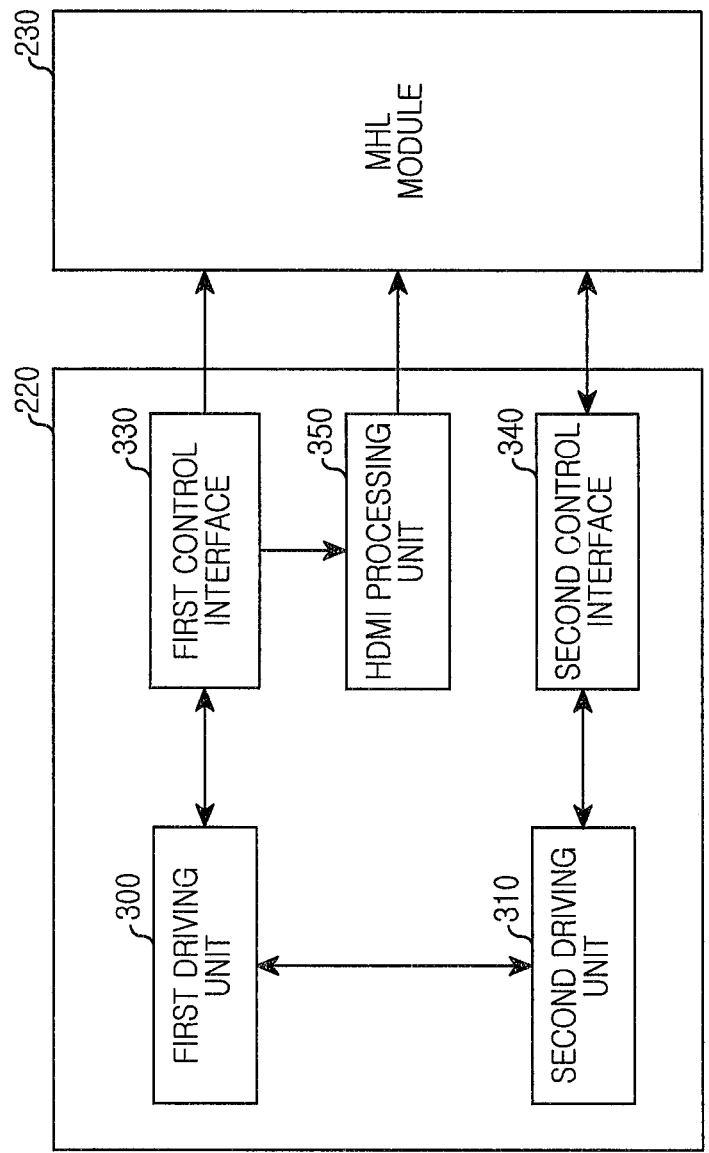
FIG. 3 is a block diagram illustrating a detailed configuration of a processor according to an embodiment of the present disclosure.

FIG. 3 illustrates a detailed block diagram of a processor according to various embodiments of the present disclosure.

Referring to FIG. 3, the processor 220 may include a first driving unit 300, a second driving unit 310, a first control interface 330, a second control interface 340, and a HDMI processing unit 350.

The first driving unit 300 may execute a first operating system stored in the program storage unit and control a content service. The content service may be a service for controlling the playback of unencrypted content. For example, when unencrypted content is played back using the second electronic device 120, the first driving unit 300 may allow the MHL module 230 and the HDMI processing unit 350 to transmit the content to the second electronic device 120. In this case, the first driving unit 300 may control a content service through the first control interface 330.

The second driving unit 310 may execute a second operating system stored in the program storage unit to control security of the second electronic device 200. For example, the second driving unit 310 may perform decoding for DRM content. When an event for checking a HDCP state occurs, the second driving unit 310 may connect to the MHL module 230 through the second control interface 340 and receive HDCP state information. The second control interface 340 is an interface designed to limit access to the first driving unit 300 and implemented by a hardware configuration. The second driving unit 310 may request the HDCP state information through the second control interface 340.

In addition, the second driving unit 310 may control a DRM service in consideration of the HDCP state information provided from the MHL module 230. When the HDCP state information is "success", the second driving unit 310 may continuously provide the service using the DRM content. When the HDCP state information is "fail", the second driving unit 310 may suspend decoding and decryption of the DRM content. When the HDCP for the DRM content is disabled, the second driving unit 310 may suspend decoding and decryption of the DRM content.

The first control interface 330 is an interface for connecting the first driving unit 300 to the MHL module 230 and connecting the first driving unit 300 to the HDMI processing unit 350 and may transmit and receive control information for controlling content services. That is, the first control interface may transmit and receive control information for controlling playback of unencrypted content. For example, the first control interface 330 may transmit and receive control information for controlling the MHL module 230 and control information for controlling the HDMI processing unit 350.

The second control interface 340 is an interface for connecting the second driving unit 310 to the MHL module 230 and may be configured by hardware so as to limit access of the first driving unit 300. The second control interface 340 may transmit and receive control information for controlling DRM services. The second control interface 340 may transmit and receive control information which allows the second driving unit 310 to acquire HDCP state information from the MHL module 230.

The second control interface 340 may receive a request for HDCP state information and transmit the request to the MHL module 230 through the second driving unit 310.

The second control interface 340 may receive HDCP state information from the MHL module 230 in response to the request for HDCP state information and provide the HDCP state information to the second driving unit 310.

The second control interface 340 may be a plurality of hardware connections, such as I2C line (HW I2C), MMIO (Memory Mapped IO), or ISP (InSystem Programmer), which may be defined between the MHL module and the processor.

The HDMI processing unit 350 may convert content into HDMI signals under the control of the first driving unit 300 and transmit the HDMI signals to the MHL module 230.

The MHL module 230 of FIG. 3 may perform processing such that the HDCP state information is delivered to the second driving unit through the second control interface when the request for HDCP state information which is generated by the second driving unit 310 is detected through the second control interface.

Figure 4:
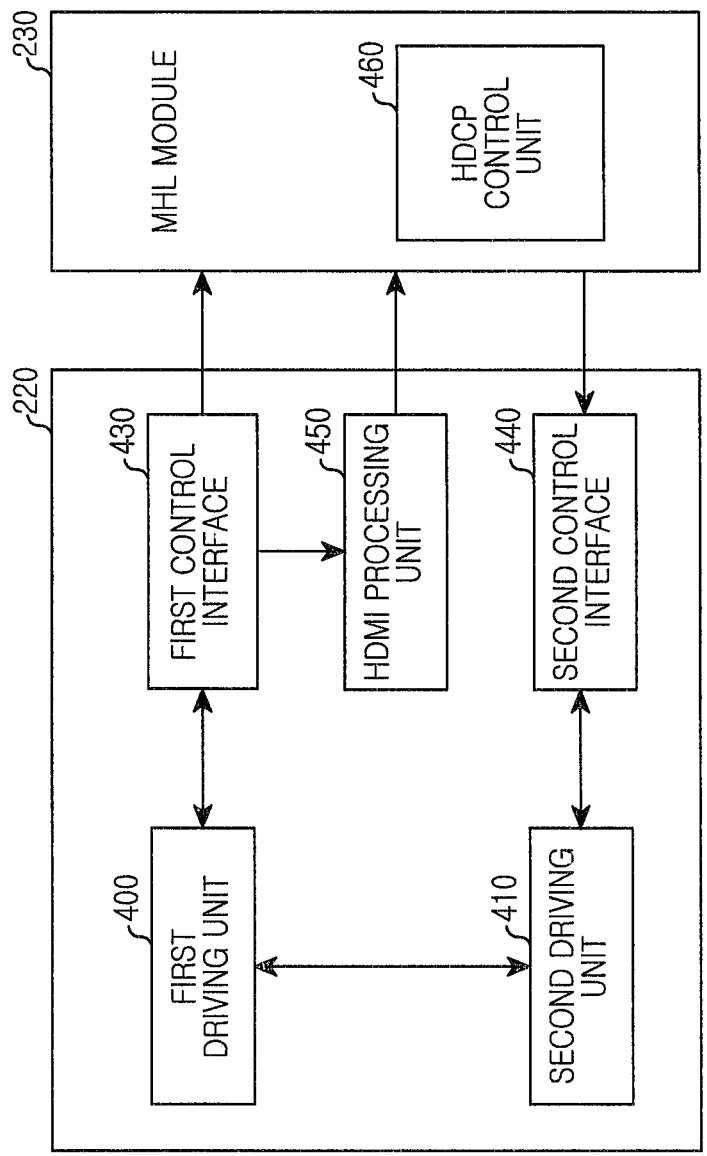
FIG. 4 is a block diagram illustrating a detailed configuration of a processor according to another embodiment of the present disclosure.

FIG. 4 illustrates a detailed block diagram of a processor according to various embodiments of the present disclosure.

Referring to FIG. 4, the processor 220 may include a first driving unit 400, a second driving unit 410, a first control interface 430, a second control interface 440, and a HDMI processing unit 450.

The first driving unit 400 may execute a first operating system stored in the program storage unit to control a content service. For example, when unencrypted content is played back using the second electronic device 120, the first driving unit 400 may enable the MHL module 230 and the HDMI processing unit 450 to transmit the content to the second electronic device 120. In this case, the first driving unit 400 may control a content service through the first control interface 430.

The second driving unit 410 may execute a second operating system stored in the program storage unit to control security of the second electronic device 200. For example, when an event for checking a HDCP state occurs, the second driving unit 410 may connect to the MHL module 230 through the second control interface 440 and receive HDCP state information. The second control interface 440 is an interface designed to limit access to the first driving unit 400 and implemented by a hardware configuration. The second driving unit 410 may receive the HDCP state information from the MHL module 230 through the second control interface 440.

In addition, the second driving unit 440 may control the DRM service in consideration of the HDCP state information provided from the MHL module 230. When the HDCP state information is "success", the second driving unit 410 may continuously provide the service using the DRM content. When the HDCP state information is "fail", the second driving unit 410 may suspend decoding and decryption of the DRM content. When the HDCP for the DRM content is disabled, the second driving unit 410 may suspend decoding and decryption of the DRM content.

The first control interface 430 is an interface for connecting the first driving unit 400 to the MHL module 230 and connecting the first driving unit 400 to the HDMI processing unit 450 and may transmit and receive control information for controlling content services. For example, the first control interface 430 may transmit and receive control information for controlling the MHL module 230 and control information for controlling the HDMI processing unit 450.

The second control interface 440 is an interface for connecting the second driving unit 410 to the MHL module 230 and is implemented by hardware so as to limit access of the first driving unit 400. The second control interface 440 may transmit and receive control information which allows the second driving unit 410 to acquire HDCP state information from the MHL module 230.

The second control interface 440 may receive the HDCP state information that is updated by the HDCP control unit 460 of the MHL module 230. That is, whenever an event that the HDCP state information is updated occurs (HDCP enable, HDCP disable, HDCP key mismatching, or HDCP fail), the second control interface 440 may receive the updated HDCP state information from the MHL module 230 and deliver the updated HDCP state information to the second driving unit 410.

The second control interface 440 may be a plurality of hardware connections, such as I2C line (HW I2C), MMIO (Memory Mapped IO), or ISP (InSystem Programmer), which may be defined between the MHL module and the processor.

The HDMI processing unit 450 may convert content into HDMI signals under the control of the first driving unit 400 and transmit the HDMI signals to the MHL module 230.

The MHL module 230 may include the FIDCP control unit 460 which may update the HDCP state information every time when an event that the HDCP state information is updated occurs (HDCP enable, HDCP disable, HDCP key mismatching, or HDCP fail). When the HDCP state information is updated by the HDCP control unit 232, the MHL module 230 may enable the updated HDCP state information to be delivered to the second driving unit through the second control interface.

The electronic device according to various embodiments of the present disclosure may be configured as described below.

The electronic device includes at least one processor for executing a plurality of operating systems and a MHL module. The processor may include a normal operating system (a normal world) for controlling a content service and a secure operating system for receiving information for controlling DRM content from the MHL module and controlling a DRM service. The secure operating system controls the DRM service using the received information through a control interface to limit access of the normal operating system.

The processor may include a first control interface connected to the normal operating system for providing the content service and a second control interface connected to the secure operating system for providing the DRM service.

The information for controlling operation of the normal operating system includes HDCP state information, and the HDCP state information is provided through the second control interface.

The second control interface is configured by hardware to limit access of the normal operating system.

The second control interface receives a request for the HDCP state information from the secure operating system and provides the HDCP state information of the MHL module to the secure operating system.

The MHL module provides the updated HDCP state information to the second control interface and the second control interface provides the updated HDCP state information provided from the MHL module to the secure operating system.

The first control interface performs control operation except the request for the HDCP state information.

The MHL module is arranged outside the processor.

Figure 5:
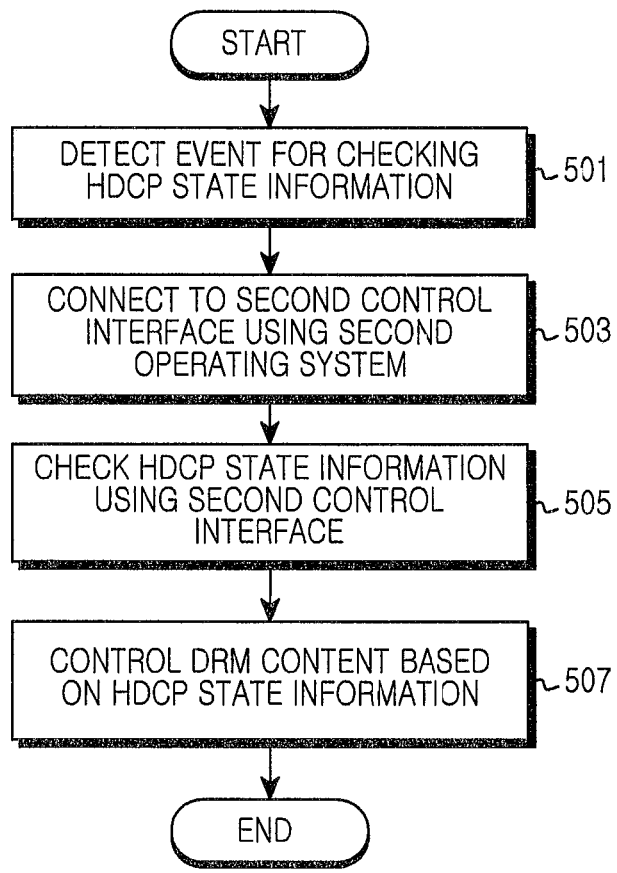
FIG. 5 is a flowchart illustrating a process of checking HDCP state information in an electronic device according to various embodiments of the present disclosure.

FIG. 5 is a flowchart illustrating a process of checking HDCP state information in an electronic device according to various embodiments of the present disclosure.

In the following description, it is assumed that the electronic device 200 checks HDCP state information by using the processor 220 configured as illustrated in FIG. 3.

Referring to FIG. 5, the processor 220 of the electronic device 200 may detect a HDCP state information checking event in operation 501. The detection of an event for checking HDCP state information refers to detecting a time point at which the electronic device checks HDCP state information for controlling a DRM service. The processor 220 may determine that the event for checking HDCP state information is detected when DRM content is played back, when a period for checking HDCP state information is reached during playback of the DRM content, or when HDCP state information stored in the MHL module is updated.

In addition, the processor 220 may connect to the second control interface using the secure operating system in operation 503. The second control interface is an interface implemented by hardware, which connects the secure operating system and the MHL module 230 and is not allowed to be accessed through a normal operating system.

In addition, the processor 220 may check HDCP state information using the second control interface 230 in operation 505.

According to an embodiment, the processor 220 may generate a request for HDCP state information using the secure operating system and the HDCP state information may be provided to the MHL module 230 through the second control interface.

Therefore, the processor 220 may receive the HDCP state information from the MHL module 230 through the second control interface, in response to the request for HDCP state information.

According to another embodiment, the processor 220 may receive updated HDCP state information from the MHL module 230 through the second control interface.

The processor 220, which has checked the HDCP state information as described above, may control a DRM service for DRM content in consideration of the HDCP state information received through the second control interface in operation 507. When the HDCP state information is "success", the second driving unit 310 may keep a multimedia service using the DRM content running. When the HDCP state information is "fail", the second driving unit 310 may suspend decoding and decryption of the DRM content. When the HDCP for the DRM content is disabled, the second driving unit 310 may suspend decoding and decryption of the DRM content.

Figure 6:
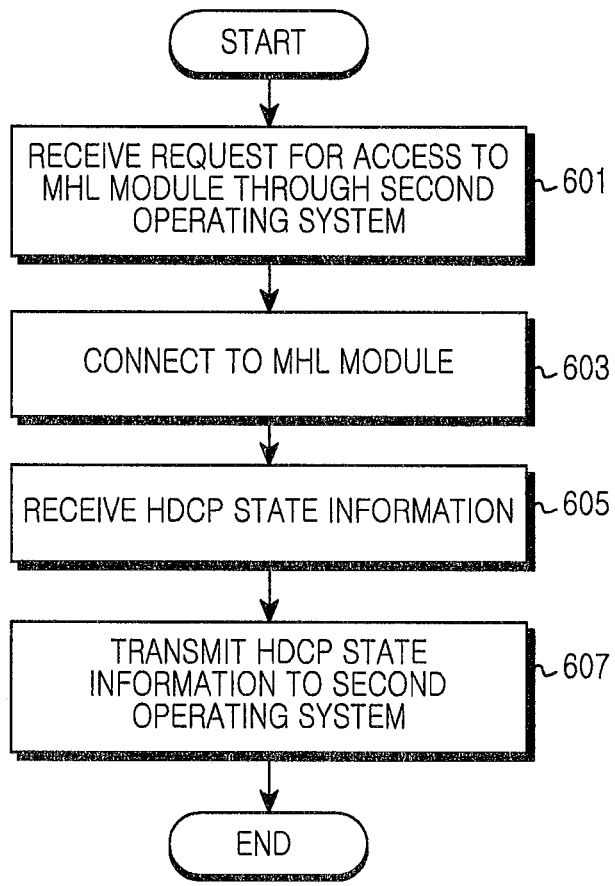
FIG. 6 is a flowchart illustrating a process of providing HDCP state information in an electronic device according to an embodiment of the present disclosure.

FIG. 6 is a flowchart illustrating a process of providing HDCP state information in an electronic device according to various embodiments of the present disclosure.

There is provided a process of checking HDCP state information in the second control interface which connects the secure operating system to the MHL module in the configuration of the processor 220 illustrated in FIG. 3.

The second control interface 340 may be configured by hardware to limit access of a normal operating system, for example, be a plurality of hardware connections, such as I2C line (HW I2C), MMIO (Memory Mapped IO), or ISP (InSystem Programmer), which may be defined between the MHL module and the processor.

Referring to FIG. 6, the second control interface 340 of the processor 220 may receive a request for access to the MHL module through the secure operating system in operation 601.

The second control interface 340 may receive a request for requesting a current HDCP state from the MHL module 230 (a request for requesting determination as to whether a HDCP is enabled or disabled or the state of a value r1 for verifying integrity of a HDCP link) from the secure operating system.

In addition, the second control interface 340 may connect to the MHL module 230 and perform the delivery of the request received from the secure operating system in operation 603.

In addition, the second control interface 340 may receive the HDCP state information from the MHL module 230 in response to the request of the secure operating system in operation 605.

The MHL module 230, received the request for the state of the HDCP form the second control interface 340, may perform authentication with the secure operating system that has requested the state of the HDCP and then provide HDCP state information to the MHL module 230 only when the secure operating system is identified as being justified.

In addition, the second control interface 340 may transmit the HDCP state information received from the MHL module 230 to the secure operating system in operation 607.

Although there is provided the second control interface 340 which provides the HDCP state information from the MHL module 230 to the secure operating system according to a request of the secure operating system in the above description, the second control interface 340 according to this disclosure may receive updated HDCP state information and provides the updated HDCP state information whenever the HDCP state information is updated by the MHL module.

That is, the secure operating system may acquire HDCP state information using an interrupt method. For example, the second control interface 340 may be defined as an interrupt source. When HDCP state information (for example, an event such as HDCP disable, HDCP shutdown, HDCP key mismatching, or HDCP 1st step fail, occurs) is updated, the MHL module 230 connected to the second control interface 340 may provide the updated HDCP state information to the secure operating system through the second control interface 340.

Figure 7:
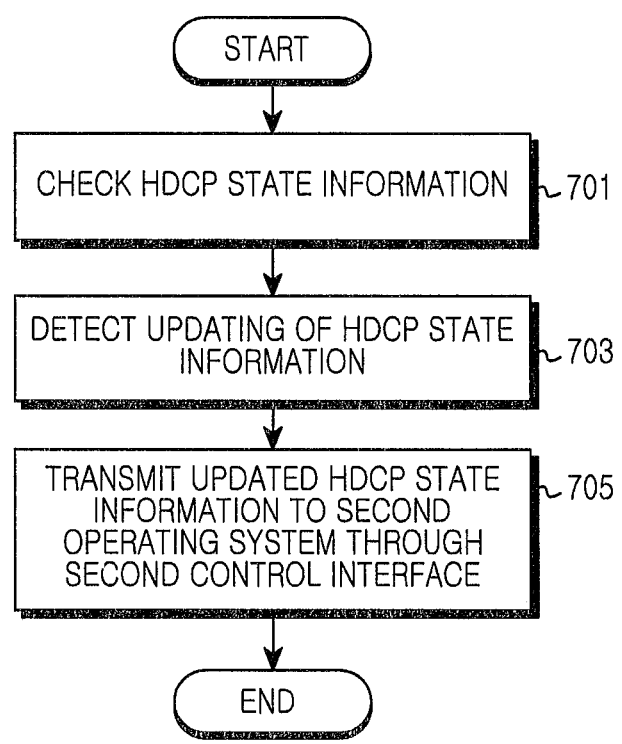
FIG. 7 is a flowchart illustrating a process of providing HDCP state information in an electronic device according to another embodiment of the present disclosure.

FIG. 7 is a flowchart illustrating a process of providing HDCP state information in an electronic device according to various embodiments of the present disclosure.

There is provided a process of providing HDCP state information through the second control interface 440 connected to a secure operating system (secure world) in the configuration of the MHL module 230 illustrated in FIG. 4.

The MHL module 230 may include the HDCP control unit 460 which may set and update HDCP state information for DRM content, That is, when updating of HDCP state information occurs (for example, an event such as HDCP disable, HDCP shutdown, HDCP key, mismatching, or HDCP 1st step fail, occurs), the HDCP control unit 460 may update the HDCP state information and provide the updated HDCP state information to the secure operating system through the second control interface 440.

First, the MHL module 230 may check the HDCP state information in operation 701.

The MHL module 230 may check whether the HDCP state information is updated based on the HDCP state information in operation 703.

For example, the MHL module 230 may determine that the HDCP state information is updated when an event such as HDCP disable, HDCP shutdown, HDCP key mismatching, or HDCP 1st step fail, occurs.

The MHL module 230 may perform processing such that the updated HDCP state information is transmitted to the secure operating system through the second control interface 440 in operation 705.

The MHL module 230 may transmit the HDCP state information to the secure operating system through the second control interface 440 which is not allowed to be accessed through a normal operating system.

The electronic device according to various embodiments of the present disclosure may perform operation as described below.

The electronic device may perform checking a high-bandwidth digital content protocol (HDCP) state information from a mobile high-definition link (MHL) module separate from a processor by using a secure operating system and controlling the DRM service based on the checked HDCP state information.

The secure operating system may check the HDCP state information using a control interface, and the control interface may limit access of a normal operating system.

The HDCP state information may be checked through the control interface configured in at least one of a hardware (H/W) Inter-Integrated Circuit (I2C) type, a Memory Mapped IO (MMIO) type, and an InSystem Programmer (ISP) type.

The identifying the HDCP state information may include at least one of providing a request for HDCP state information from the secure operating system to the control interface and providing HDCP state information updated by MHL module to the control interface.

The updated HDCP state information may include at least one state information of HDCP enable, HDCP disable, HDCP key mismatching and HDCP fail.

The controlling the DRM service based on the checked HDCP state information may include suspending decoding of the DRM content when a HDCP of the DRM content is disabled or a HDCP state is "fail" based on the HDCP state information from the MHL module which is checked by the secure operating system.

Each of the above-descried elements according to the present disclosure may be configured by one or more components and the name of each element may vary depending on the type of an electronic device. The electronic device according to the present disclosure may be configured by including at least one of the above-described elements, and some elements may be omitted from or additional element may be further included in the electronic device. In addition, some of the elements of the electronic device according to the present disclosure are combined into one entity to perform functions of relevant elements before combination.

The term "element", for example, "module" as used herein may refer to a unit including one or a combination of two or more among, for example, hardware, software and firmware. The "module" may be interchangeably used with, for example, the term "unit", "logic", "logical block", "component". or "circuit". The "module" may be a smallest unit or part of an integrally formed component. The "module" may be a smallest unit or a part thereof which performs one or more functions. The "module" may be implemented mechanically or electronically. For example, the "module" according to the present disclosure may include at least one of an application-specific integrated circuit (ASIC) chip, a field programmable gate array (FPGA), a programmable-logic device, which perform certain operations, which is currently known or to be developed in future.

According to various embodiments, at least a part of the apparatus (for example, modules or functions thereof) or the method (for example, operations) according to the present disclosure may be implemented by instructions stored in a computer-readable storage media as a programming module for example. When the instructions are executed by one or more processors, the processor may perform functions corresponding to the instructions. The computer-readable storage media may be, for example, a memory. At least a part of the programming module may be implemented (for example, executed) by the processor for example. At least a part of the programming module may include, for example, a module, a program, a routine, a set of instructions or a process which performs one or more functions.

Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. The program commands may include machine language codes that may be generated by a compiler, and high-level language codes that may be executed by a computer by using an interpreter. The hardware apparatus may be configured to operate as one or more software modules in order to perform operations according to the present disclosure, or vice versa.

The module or programming module according to the present disclosure may include one or more elements among the above-described elements or emit some elements among the above-described elements, or further include another element. The operations performed by the module, programming module, or another element according to the present disclosure may be performed in a sequential manner, a parallel manner, a repetitive manner, or a heuristic manner. Furthermore, some operations may be performed in another order or be omitted, or another operation may be included.

According to various embodiments, there is provided a storage medium storing instructions that, when executed by at least one processor, cause the processor to perform at least one operation, including checking HDCP state information from a high-definition link (MHL) module separate from a processor by using a secure operating system, and controlling a DRM service based on the checked HDCP state information.

As described above, the electronic device employing the secure operating system (secure world) acquire HDCP state information through the control interface which blocks access of the normal operating system, thereby enhancing security for digital content.

In addition, the electronic device employing the secure operating system (secure world) requests HDCP state information using the control interface or receives updated HDCP state information when the HDCP state information is updated by the MHL module, thereby enhancing security for digital content.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. An electronic device comprising:
a mobile high-definition link (MHL) module; and
at least one processor operatively coupled to the MHL module, the at least one processor configured to execute a normal operating system configured to control a content service and a secure operating system configured to receive information for controlling a digital rights management (DRM) service using DRM content from the MHL module,
wherein the electronic device includes a first control interface for the normal operating system to provide the content service and a second control interface for the secure operating system to provide the DRM service,
wherein the secure operating system controls the DRM service using the received information through the second control interface to limit access of the normal operating system,
wherein the MHL module is configured to provide updated information for controlling the DRM service to the secure operating system,
wherein information for controlling the DRM service includes high-bandwidth digital content protocol (HDCP) state information,
wherein the MHL module is separate from the at least one processor,
wherein the second control interface is configured to identify the HDCP state information from the MHL module separate and control the DRM service based on the identified HDCP state information,
wherein the second control interface is configured to permit only access of the secure operating system, and
wherein the second control interface is further configured to provide a request for the HDCP state information from the secure operating system to the MHL module and provide the HDCP state information from the MHL module to the secure operating system.

2. The electronic device of claim 1, wherein the information for controlling the DRM service includes high-bandwidth (HDCP) state information.

3. The electronic device of claim 1, wherein the second control interface is configured by hardware to limit access of the normal operating system.

4. The electronic device of claim 1, wherein the MHL module is configured to provide the information for controlling the DRM service to the secure operating system through the second control interface in response to receipt of a request for the information for controlling the DRM service from the secure operating system.

5. The electronic device of claim 1, wherein the first control interface is configured to perform control operations except for receipt of the information for controlling the DRM service.

6. The electronic device of claim 1, wherein the MHL module is disposed outside the processor.

7. The electronic device of claim 1, wherein:
the second control interface is further configured to receive updated HDCP state information from the MHL module, and
updated the HDCP state information includes at least one state information among HDCP enable, HDCP disable, HDCP key mismatching, or HDCP fail.

8. The electronic device of claim 1, wherein the second control interface is further configured to suspend decoding of the DRM content when a HDCP of the DRM content is disabled or a HDCP state is "fail" based on the HDCP state information from the MHL module that is checked by the secure operating system.

9. A method of operating an electronic device, the method comprising:
execute, by at least one processor operatively coupled to a mobile high-definition link (MHL) module, a normal operating system configured to control a content service and a secure operating system configured to receive information for controlling a digital rights management (DRM) service using DRM content from the MHL module,
wherein the electronic device includes a first control interface for the normal operating system to provide the content service and a second control interface for the secure operating system to provide the DRM service,
wherein the secure operating system controls the DRM service using the received information through the second control interface to limit access of the normal operating system,
wherein the MHL module is configured to provide updated information for controlling the DRM service to the secure operating system,
wherein information for controlling the DRM service includes high-bandwidth digital content protocol (HDCP) state information,
wherein the MHL module is separate from the at least one processor,
wherein the second control interface is configured to identify the HDCP state information from the MHL module separate and control the DRM service based on the identified HDCP state information,
wherein the second control interface is configured to permit only access of the secure operating system, and
wherein the second control interface is further configured to provide a request for the HDCP state information from the secure operating system to the MHL module and provide the HDCP state information from the MHL module to the secure operating system.

10. The method of claim 9, wherein the second control interface is configured by hardware to limit access of the normal operating system.

11. The method of claim 9, wherein the MHL module is configured to provide the information for controlling the DRM service to the secure operating system through the second control interface in response to receipt of a request for the information for controlling the DRM service from the secure operating system.

12. The method of claim 9, wherein the first control interface is configured to perform control operations except for receipt of the information for controlling the DRM service.

13. The method of claim 9, wherein the MHL module is disposed outside the processor.

14. method of claim 9, wherein:
the second control interface is further configured to receive updated HDCP state information from the MHL module, and
updated the HDCP state information includes at least one state information among HDCP enable, HDCP disable, HDCP key mismatching, or HDCP fail.

15. The method of claim 9, wherein the second control interface is further configured to suspend decoding of the DRM content when a HDCP of the DRM content is disabled or a HDCP state is "fail" based on the HDCP state information from the MHL module that is checked by the secure operating system.

\* \* \* \* \*